United States Patent [19]

Fukui et al.

[11] Patent Number: 5,529,586
[45] Date of Patent: Jun. 25, 1996

[54] COMPOSITIONS CONTAINING A BENZODIFURANONE COMPOUND AND METHODS FOR COLORING HYDROPHOBIC MATERIALS USING THE SAME

[75] Inventors: Toshinori Fukui, Toyonaki; Nobuyuki Katsuda, Ashiya; Shinichi Yabushita, Mishima-gun; Shuhei Hashizume, Osaka, all of Japan

[73] Assignee: Sumitomo Chemical Company, Limited, Osaka, Japan

[21] Appl. No.: 294,720

[22] Filed: Aug. 23, 1994

[30] Foreign Application Priority Data

Aug. 26, 1993 [JP] Japan .................................. 5-211382

[51] Int. Cl.$^6$ .......................... C09B 57/00; C09B 29/06; D06P 1/16
[52] U.S. Cl. .......................... 8/639; 8/638; 8/922; 8/933; 8/934
[58] Field of Search ................ 8/638, 639, 922, 8/933, 934

[56] References Cited

U.S. PATENT DOCUMENTS

| | | |
|---|---|---|
| 4,115,404 | 9/1978 | Greenhalgh et al. . |
| 4,122,087 | 10/1978 | Greenhalgh et al. . |
| 4,650,882 | 3/1987 | Kenyon et al. . |
| 4,872,882 | 10/1989 | Hähnke et al. . |
| 5,077,416 | 12/1991 | Ueda et al. . |
| 5,281,241 | 1/1994 | Patel . |

FOREIGN PATENT DOCUMENTS

| | | |
|---|---|---|
| 0033583 | 8/1981 | European Pat. Off. . |
| 0305886 | 3/1989 | European Pat. Off. . |
| 0397170 | 11/1990 | European Pat. Off. . |
| 56-122869 | 9/1981 | Japan . |
| 60-152567 | 8/1985 | Japan . |
| 61-54058 | 11/1986 | Japan . |
| 64-70566 | 3/1989 | Japan . |
| 3-14876 | 1/1991 | Japan . |
| 3-72571 | 3/1991 | Japan . |
| 5-287211 | 11/1993 | Japan . |

*Primary Examiner*—Margaret Einsmann
*Attorney, Agent, or Firm*—Watson Cole Stevens, Davis

[57] ABSTRACT

A composition containing benzodifuranone compounds for coloring hydrophobic materials in red which comprises at least one compound selected from the group of benzodifuranone compounds represented by the formula (I):

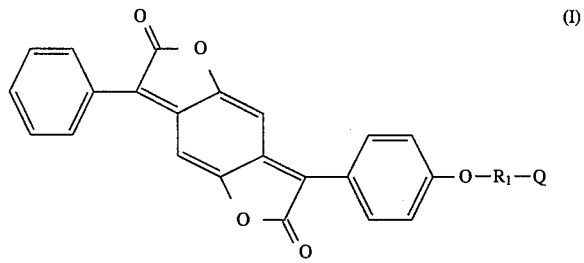

wherein $R_1$ represents a methylene group, a hydroxide group or a straight chain or branched $C_{2-6}$ alkylene group which may be substituted by a $C_{1-4}$ alkoxy or $C_{1-4}$ alkylcarbonyloxy group, Q represents a 5- or 6-membered saturated or unsaturated heterocyclic ring residue which may be substituted; and at least one compound selected from the group consisting of benzeneazo compounds and/or benzothiazolazo compounds.

8 Claims, No Drawings

COMPOSITIONS CONTAINING A BENZODIFURANONE COMPOUND AND METHODS FOR COLORING HYDROPHOBIC MATERIALS USING THE SAME

The present invention relates to a composition for coloring hydrophobic materials in red containing benzodifuranone compounds, and methods for coloring hydrophobic materials using the same. In more detail the present invention relates to a composition which contains a red benzodifuranone compound and red azo compounds, and aplications of said composition to the methods for coloring hydrophobic materials.

Various benzodifuranone compounds usable for dyeing or printing hydrophobic fibers have been mentioned, for example, in JP-A-60-152567 ("JP-A-" means Unexamined Japanese Patent Application, i.e. KOKAI), JP-A-52-109526, JP-A-56-122869, JP-A-3-14876 and JP-A-3-72571, etc.

In recent years, with a consumer's trend toward higher grade clothing, disperse dyes, excellent in the properties of dyeability and fastness, have been increasingly desired. Under such circumstances, materials consisting mainly of hydrophobic fibers dyed with disperse dyes have come to be subjected to various after-finishing treatments, such as softening, antistatic, feel-improving finishing and the like, in order to impart added value to the material. Since these after-finishings are, however, carried out at high temperatures, the dyes in the mateials tend to bleed so that the wet fastness properties and, particularly, the washing fastness properties are deteriorated.

So far, many compounds, mainly azo compounds, have been proposed in order to develop a red disperse dye having a good washing fastness property. Most of them have not yet completely solved the problems of the deterioration in washing fastness during after-finishing treatments.

Many benzodifuranone compounds have been proposed too. Though they are good in washing fastness, still further improvements are desired in their dye characteristics and other fastness properties.

To solve these problems, the present inventors have conducted extensive studies, and accomplished the present invention.

The present invention provides a composition containing benzodifuranone compounds for coloring hydrophobic mateials in red which comprises at least one compound selected from the group of benzodifuranone compounds represented by the formula (I)

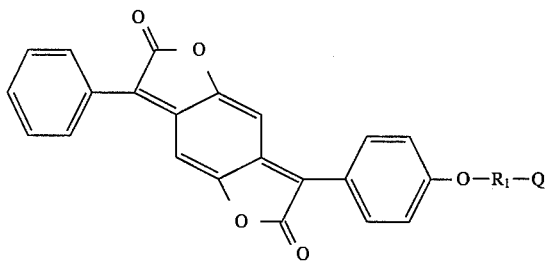

wherein $R_1$ represents a methylene group or a straight chain or branched $C_{2-6}$ alkylene group which may be optionally substituted by a $C_{1-4}$ alkoxy, hydroxy or $C_{1-4}$ alkylcarbonyloxy group, Q represents a 5- or 6-membered saturated or unsaturated heterocyclic ring residue which may be optionally substituted with various substituents as disclosed bellow; and at least one compound selected from the group consisting of benzeneazo compounds represented by the formula (II)

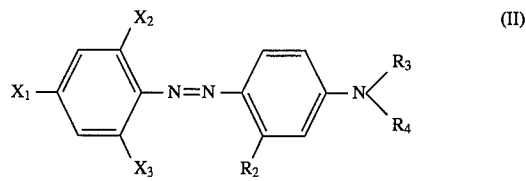

wherein $X_1$ represents a nitro group or $C_{1-4}$ alkyl group, $X_2$ represents a hydrogen atom or a cyano group, $X_3$ represents a hydrogen atom, a halogen atom, a cyano group, a $C_{1-4}$ alkylsulfonyl group or a $C_{1-4}$ alkoxy group, $R_2$ represents a hydrogen atom, a halogen atom, a $C_{1-4}$ alkyl group, a $C_{1-4}$ alkylcarbonylamino group, a phenylcarbonylamino group or a $C_{1-4}$ alkylsulfonylamino group, $R_3$ and $R_4$ each independently represent a $C_{1-4}$ alkyl group, a $C_{1-4}$ alkyl group substituted by $C_{1-4}$ alkylcarbonyloxy, $C_{1-4}$ alkoxycarbonyl, phenylcarbonyloxy, phenyl, $C_{1-4}$ alkoxy, $C_{1-4}$ alkoxy which is substituted by a $C_{1-4}$ alkoxy group, $C_{1-4}$ alkoxycarbonyloxy, phenoxy, hydroxy or cyano or a 2-(pyrrolidine-2,5-dione)ethyl group, and benzothiazolazo compounds represented by the formula (III)

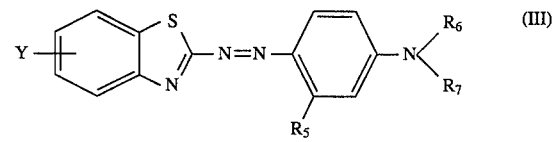

wherein Y represents a hydrogen atom, a halogen atom, a $C_{1-4}$ alkoxy group, a $C_{1-4}$ alkylsulfonyl group or a nitro group, $R_5$ represents a hydrogen atom, a $C_{1-4}$ alkyl group, a phenylcarbonylamino group, a $C_{1-4}$ alkylcarbonylamino group, $R_6$ and $R_7$ each independently represent a $C_{1-5}$ alkyl group, a $C_{1-4}$ alkyl group substisuted by hydroxy, $C_{1-4}$ alkylcarbonyloxy or cyano.

The present invention also provides methods for coloring hydrophobic materials using the composition above-mentioned.

The compounds represented by the above formula (I) may be selected from the group of known compounds as mentioned, for example, in JP-A-3-72571, etc. Examples of the saturated heterocyclic ring residues represented by Q in the formula (I) include tetrahydrofuryl, tetrahydrothienyl, tetrahydropyranyl, pyrrolidyl, piperidyl, piperazyl, morpholinyl and the like. Examples of the unsaturated heterocyclic ring residues include furyl, thienyl, pyrrolyl, pyridyl, pyranyl, thiazolyl, s-triazinyl and the like. These heterocyclic ring residues may be optionally substitued by a halogen atom, a hydroxy group, a $C_{1-4}$ alkyl group, a $C_{1-4}$ alkoxy group, a $C_{1-4}$ alkylcarbonyl group, a $C_{1-4}$ alkoxy carbonyl group, a cyano group, an amino group, a keto group or the like. Among these heterocyclic ring residues, a tetrahydrofuryl or tetrahydropyranyl group which may be optionally substisuted by $C_{1-4}$ alkyl or morpholinyl group is prefered. Specific examples of the compounds particularly preferably used in the present invention are shown in the following Table 1.

TABLE 1

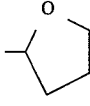

| Compound No. | R₁ | Q |
|---|---|---|
| (a)-1 | CH₂ | 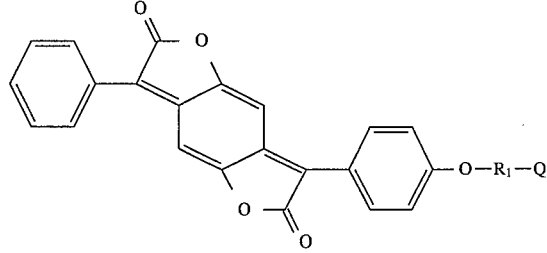 |
| (a)-2 | CH₂CHCH₂<br>\|<br>OH | 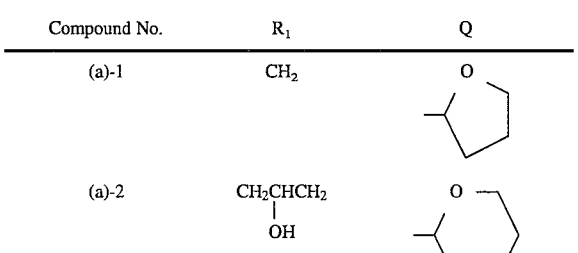 |
| (a)-3 | CH₂CHCH₂<br>\|<br>OCH₃ | 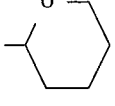 |
| (a)-4 | C₃H₆ | 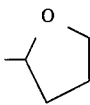 |
| (a)-5 | CH₂ | 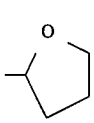 |

TABLE 1-continued

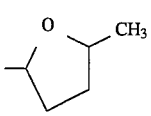

| Compound No. | R₁ | Q |
|---|---|---|
| (a)-6 | C₃H₆CHCH₂<br>\|<br>OCOCH₃ | 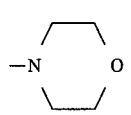 |

The compounds represented by the formula (II) or (III) are compounds selected from the group of known compounds as mentioned, for example, in JP-B-40-25431 ("JP-B-" means Examined Japanese Patent Application, i.e. KOKOKU JP-B-44-8117, JP-A-51-134724, JP-A-53-113830, JP-A-56- 110766, JP-B-36-16039. JP-B-45-8750, JP-A-55-16972, JP-A- 56-37378, JP-A-60-119281, JP-A-55-90685, "KAISETSU SENRYO KAGAKU, SHIKISEN-SHA", "RIRON SEIZO SENRYO KAGAKU, YUTAKA HOSODA", "SENRYO BINRAN, YUKI GOSEIKAGAKU KYOKAI", etc. Specific examples of the compounds represented by the formula (II) or (II) particularly preferably used the present invention are shown in the following Table 2, 3 or 4.

TABLE 2

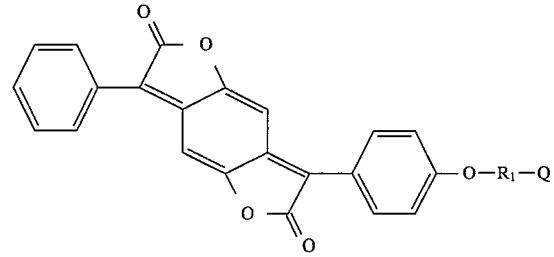

| Compound No. | X₁ | X₂ | X₃ | R₂ | R₃ | R₄ |
|---|---|---|---|---|---|---|
| (b)-1 | NO₂ | H | Cl | H | C₂H₅ | C₂H₄CN |
| (b)-2 | NO₂ | H | Cl | H | C₂H₄OCOCH₃ | C₂H₄CN |
| (b)-3 | NO₂ | H | Cl | H | C₂H₄OH | C₂H₄CN |
| (b)-4 | NO₂ | H | H | NHCOC₂H₅ | C₂H₄OCOCH₃ | C₂H₄OCOCH₃ |
| (b)-5 | NO₂ | H | SO₂CH₃ | H | C₂H₅ | C₂H₄OCOCH₃ |
| (b)-6 | NO₂ | H | Cl | H | C₂H₄OCOCH₃ | C₂H₄CN |
| (b)-7 | NO₂ | H | H | NHCO—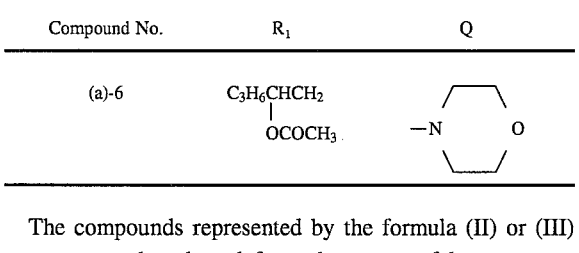 | C₂H₄OCOCH₃ | C₂H₄OCOCH₃ |
| (b)-8 | NO₂ | H | Cl | CH₃ | C₂H₄OCO—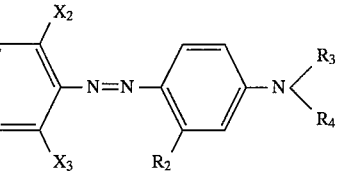 | C₂H₄CN |
| (b)-9 | NO₂ | H | H | CH₃ | C₂H₄OCOCH₃ | C₂H₄OCOCH₃ |
| (b)-10 | NO₂ | H | Cl | NHCOC₂H₅ | C₂H₄OCOCH₃ | C₂H₄OCOCH₃ |
| (b)-11 | NO₂ | H | Cl | NHCOCH₃ | C₂H₄OCOCH₃ | C₂H₄OCOCH₃ |

TABLE 2-continued

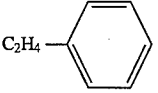

| Compound No. | $X_1$ | $X_2$ | $X_3$ | $R_2$ | $R_3$ | $R_4$ |
|---|---|---|---|---|---|---|
| (b)-12 | $NO_2$ | H | Cl | $CH_3$ | $C_2H_4CN$ | $C_2H_4OH$ |
| (b)-13 | $NO_2$ | H | Br | H | $C_2H_4$—C$_6$H$_5$ | $C_2H_4CN$ |
| (b)-14 | $NO_2$ | H | Cl | $NHCOCH_3$ | $C_2H_4OCOCH_3$ | $C_2H_4OCOCH_3$ |
| (b)-15 | $NO_2$ | H | Cl | $NHCOCH_3$ | $C_2H_4OCOCH_3$ | $C_2H_4CN$ |

TABLE 3

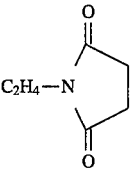

| Compound No. | $X_1$ | $X_2$ | $X_3$ | $R_2$ | $R_3$ | $R_4$ |
|---|---|---|---|---|---|---|
| (b)-16 | $NO_2$ | H | Cl | $CH_3$ | $C_2H_4OCOCH_3$ | $C_2H_4CN$ |
| (b)-17 | $NO_2$ | H | Cl | $NHCOCH_3$ | $C_2H_4OC_2H_4OC_2H_5$ | $C_2H_4CN$ |
| (b)-18 | $NO_2$ | H | H | $NHCOCH_3$ | $C_2H_4OCOCH_3$ | $C_2H_4COOCH_3$ |
| (b)-19 | $NO_2$ | H | Cl | $NHCOCH_3$ | $C_2H_5$ | $C_2H_4$—succinimidyl |
| (b)-20 | $NO_2$ | H | $OCH_3$ | $NHCOCH_3$ | $C_2H_4COOCH_3$ | $C_2H_4OCOCH_3$ |
| (b)-21 | $NO_2$ | H | H | $NHCOCH_3$ | $C_2H_5$ | $C_2H_4$—succinimidyl |
| (b)-22 | $NO_2$ | H | Cl | H | $C_2H_4OC_2H_5$ | $C_2H_4CN$ |
| (b)-23 | $NO_2$ | H | Cl | H | $C_2H_5$ | $C_2H_4O$—C$_6$H$_5$ |
| (b)-24 | $NO_2$ | H | Cl | $NHCOCH_3$ | $C_2H_5$ | $C_2H_4CN$ |
| (b)-25 | $NO_2$ | CN | H | H | $C_2H_4OCOCH_3$ | $C_2H_4CN$ |
| (b)-26 | $NO_2$ | CN | H | H | $C_2H_5$ | $C_2H_4CN$ |
| (b)-27 | $NO_2$ | CN | H | H | $C_2H_4OCOCH_3$ | $C_2H_4CN$ |
| (b)-28 | $NO_2$ | CN | H | H | $C_2H_4OCOOCH_3$ | $C_2H_4OCOOCH_3$ |

TABLE 3-continued $$X_1 \underset{X_3}{\overset{X_2}{\bigcirc}} - N = N - \underset{R_2}{\bigcirc} - N\underset{R_4}{\overset{R_3}{<}}$$

| Compound No. | $X_1$ | $X_2$ | $X_3$ | $R_2$ | $R_3$ | $R_4$ |
|---|---|---|---|---|---|---|
| (b)-29 | $NO_2$ | CN | H | H | $C_2H_4$—⟨phenyl⟩ | $C_2H_4CN$ |
| (b)-30 | $NO_2$ | CN | H | $CH_3$ | $C_2H_4OCOCH_3$ | $C_2H_4CN$ |
| (b)-31 | $NO_2$ | CN | H | Cl | $C_2H_4OCOOC_2H_5$ | $C_2H_4OCOOC_2H_5$ |
| (b)-32 | $NO_2$ | CN | H | H | $C_2H_4O$—⟨phenyl⟩ | $C_2H_4CN$ |
| (b)-33 | $CH_3$ | CN | CN | $NHSO_2CH_3$ | $C_2H_5$ | $C_2H_5$ |

TABLE 4

$$\underset{Y_1}{\overset{Y_2}{\underset{}{\bigcirc}}}\overset{Y_3}{\underset{N}{\overset{S}{>}}} - N = N - \underset{R_5}{\bigcirc} - N\underset{R_7}{\overset{R_6}{<}}$$

| Compound No. | $Y_1$ | $Y_2$ | $Y_3$ | $R_5$ | $R_6$ | $R_7$ |
|---|---|---|---|---|---|---|
| (c)-1 | H | $OCH_3$ | H | H | $C_2H_4OH$ | $C_2H_4OH$ |
| (c)-2 | H | $SO_2CH_3$ | H | $CH_3$ | $C_2H_5$ | $C_2H_4CN$ |
| (c)-3 | H | $SO_2CH_3$ | H | H | $CH_3$ | $C_2H_4OCOCH_3$ |
| (c)-4 | Cl | Cl | H | $CH_3$ | $C_2H_5$ | $C_2H_4CN$ |
| (c)-5 | H | Cl | Cl | $CH_3$ | $C_2H_5$ | $C_2H_4CN$ |
| (c)-6 | Cl | Cl | H | H | $C_2H_5$ | $C_2H_4CN$ |
| (c)-7 | H | Cl | Cl | H | $C_2H_5$ | $C_2H_4CN$ |
| (c)-8 | H | $NO_2$ | H | H | $C_2H_4OCOCH_3$ | $C_2H_4CN$ |
| (c)-9 | H | Cl | H | NHCO—⟨phenyl⟩ | $C_2H_4OCOCH_3$ | $C_2H_4OCOCH_3$ |
| (c)-10 | H | Cl | H | $NHCOCH_3$ | $C_5H_{11}$ | $C_2H_4CN$ |

The blend ratio of at least one member selected from the group of compounds represented by the above formula (I) and at least one member selected from the group consisting of compounds represented by the above formula (II) and compounds represented by the above formula (III) may be determined according to the desired characteristic of the composition to be obtained. Usually, the ratio based on pure content is from 99–1 weight % to 1–99 weight %, preferably from 90–10 weight % to 10–90 weight % and more preferably from 80–20 weight % to 20–80 weight %. The ratio of the compounds represented by the formula (II) and the compounds represented by the formula (III) is not limited when they are used in combination.

The composition of the present invention can be prepared by mixing the compound represented by the above formula (I) and the compound represented by the above formula (II) and/or (III) according to well-known methods in a definite amount ratio depending on the desired usages. For the purpose of color controlling, etc, the composition may contain other compound(s) in addition to the compound represented by the above formula (I) and the compound represented by the above formula (II) and/or (III) and may further contain a dispersing agent, a weighting agent, pH controlling agent, dispersion level dyeing agent, dyeing auxiliary, solvent, resin binder and the like.

The compositions of the present invention prepared by mixing benzodifuranone compounds and azo compounds, are useful as a disperse dyes and a sublimation transfer type heat-sensitive recording materials for coloring hydrophobic materials, such as polyester, triacetate, diacetate, polyamide, polycarbonate or the like. Particulary the compositions of the present invention are useful as red disperse dyes for dyeing or printing hydrophobic fiber materials.

When the composition of the present invention is used as a disperse dye, wet cakes of the compounds represented by the above formula (I) and the compound represented by the above formula (II) and/or (III), from the respective manufacturing processes, are mixed with a single, or mixed, dispersing agent such as naphthalene sulfonate-formalin condensate and ligninsulfonic acid, and then finely dispersed, for example, with sand mill. The composition of the present invention is used in the form of a liquid product, a powder product or a granule product.

For dyeing hydrophobic fiber materials, the composition of the present invention is dispersed in an aqueous medium to make a dyeing bath, pH controlling agent, dispersion level dyeing agent and the like are added thereto, if required and the hydrophobic fiber is dipped into the dyeing bath thus prepared. In the case of polyester fiber, for example, the dyeing is conducted under an elevated pressure at 100° C. or higher, preferably 105°–140° C., for from 30 to 60 minutes. The time period may be shortened or extended depending on the dyeing affinity. The dyeing may be carried out in the presence of a carrier, such as o-phenylphenol and methylnaphthalene at a relatively high temperature, such as a water-boiling condition.

Furthermore, a dyeing method in which the dye dispersion is padded onto a cloth, followed by steaming or dry-heating treatment may be carried out.

In the case of printing, a dye dispersion is kneaded with a suitable paste, the resulting paste is printed on a cloth and dried and then the printed cloth is subjected by a steaming or dry-heating treatment. Alternatively, the printing may be carried out by an ink-jet method.

Examples of the hydrophobic fibers include polyester fiber, triacetate fiber, diacetate fiber, polyamide fiber and the like. As examples of mixed spun or combinedly woven textiles, those from two or more kinds of the above fiber materials, or those from at least one kind of the above fiber material and at least one kind of natural fiber, such as cotton, hemp, rayon, wool or silk can be mentioned. The composition of the present invention is particulary useful for dyeing or printing polyester fiber materials.

The composition of the present invention exhibits excellent dyeing characteristics and fastness as a disperse dye for dyeing or printing hydrophobic fiber materials. Specifically, the present composition gives excellent build-up, tarring, level dyeing and light fastness due to the compounds represented by the above formula (II) and/or (III) while reserving the preferred characteristics in fastness, particulary excellent washing fastness provided by the compound represented by the above formula (I). The present compositions exhibit excellent properties as the red component of three primary colors, thus they can be used to give good combination dyeing.

The present invention will be explained in more detail by reference to the following examples. In these examples, "part" means "part by weight" and "%" means "% by weight".

EXAMPLE 1

A mixture of 0.7 part of the compound (a)-1 in Table 1 and 0.3 part of the compound (b)-2 in Table 2 and 3.0 parts of sodium naphthalenesulfonate-formalin condensate was finely dispersed in 6.0 parts of water to obtain an aqueous composition. The composition thus obtained was diluted with water to obtain 1,000 parts of a dispersion. Using the dispersion, a polyester fiber textile was dyed according to the manner mentioned below. The dyeing reproductivity was good and the dyed product thus obtained had an even color without blotches and exhibit good build-up, tarring, light fastness and washing fastness. The results are shown in Table 5.

In this example and the following examples and comparative examples, the properties of build-up, tarring and fastness were evaluated as mentioned below.

[Build-up test]

① Preparation of Dyed cloth-A and Dyed cloth-B

Dyeing bath-1 and Dyeing bath-2 were prepared as described below.

Dyeing bath-1

20 Parts of the dye dispersion prepared in an example or a comparative example and 3.0 parts of SUMIPON TF (a dyeing auxiliary, manufactured by Sumitomo Chemical Co. Ltd. Osaka Japan) were dispersed evenly in water and then 1.2 parts of acetic acid and 4.8 parts of sodium acetate were added thereto, to prepare total 3000 parts of dyeing bath. This bath was used for preparing Dyed cloth-A Dyeing bath-2

According to the same condition as for prepareing Dyeing bath-1, except that 30 parts of the dye dispersion in an example or a comparative example was used, total 3000 parts of dyeing bath was prepared. This bath was used for preparing Dyed cloth-B To each of the Dyeing baths thus prepared, 100 parts of Tetron "tropical" cloth (a polyester fiber textile, manufactured by Toray Industries, Inc.) was dipped. Then the temperature was raised from 60° to 130° C. at a rate of 1° C./minute and kept at 130° C. for 60 minutes to effect dyeing. After dyeing was completed, the dyeing bath was cooled down to 90° C. or below. Then the dyed cloth was taken out of the each of dyeing bath and washed with water, subjected to a reduction-rinsing, washed again with water and dried to obtain Dyed cloth-A or Dyed cloth-B, respectively.

② Estimation of Build-up Property

Difference between dyeing powers of Dyed cloth-A and Dyed cloth-B were estimated with the eye to compare Build-up. Estimation was according to the following criteria.

⊙ Big difference between the dyeabilities was observed.

○ Difference between the dyeabilities was observed.

Δ A little difference between the dyeabilities was observed.

x Almost no difference between the dyeabilities was observed.

[Tarring test]

③ Preparation of Dyed cloth-C

20 Parts of the dye dispersion prepared in an example or a comparative examples was dispersed evenly in water and then 1.2 parts of acetic acid and 4.8 parts of sodium acetate were added thereto, to prepare total 3000 parts of dyeing bath. Then a Tetron "jersey" cloth (a polyester knitted fabric, manufactured by Teijin Ltd.,) was wound on the inner cylinder of cloth-dyeing holder of Color Pet (a test dyeing device made by NIHON SENSHOKU KIKAI KABUSHIKI KAISHA) so tightly as not to form any gap. Upper and lower ends of the holder were fixed by elastic bands so as not to form any looseness of the cloth. After setting the outer cylinder, the holder was placed in a dyeing pot separately prepared according to the same manner as to prepare Dying-bath 1, except that SUMIPON TF was not used. Pot temperature was rapidly raised from 90° C. to 115° C., then kept at 115° C.–116° C. for 20 minutes and cooled down to 90° C.

The dyed cloth was taken out immediately, lightly washed with water, spreaded and air-dried.

④ Estimation of Tarring

The amount of aggregate adhered onto Dyed cloth-C was estimated with the eye. Estimation was according to the following criteria.

⊚ No adhered aggregate was observed.

○ Only slight amount of adhered aggregate was observed.

Δ Adhered aggregate was observed.

x Large amount of adhered aggregate was observed.

[Fastness test]

⑤ Preparation of Dyed cloth-D

According to the same conditions as to preprare the Dyeing-bath 1, except that 10 parts of the dye dispersion prepared in an example or a comparative example was used, a dyeing bath was prepared. Accoding to the same conditions as to prepare the Dyed-cloth A except using the thus prepared Dyeing bath, dyeing was effected to prepare Dyed cloth-D.

⑥ light fastness test

Measured according to JIS L-0843 (using Xenone lamp, exposure to light for 80 hours), using Dyed cloth-D. Estimation was according to the following criteria.

⊚ Almost no discoloration was observed.

○ A little discoloration was observed.

Δ Discoloration was observed.

x Much discoloration was observed.

⑦ washing fastness test

Measured according to AATCC-IIA method temperature; 50° C., time; 45 minutes), using Dyed cloth-D. Estimation was according to the following criteria.

⊚ Almost no pollution onto multifiber was observed.

○ A little pollution onto multifiber was observed.

Δ Pollution onto multifiber was observed.

x Much pollution onto multifiber was observed.

Comparative examples 1–2

For a comparison, according to the same manner as in Example 1 except that 1.0 part of the compound (a)-1 or (a)-2 in Table 1 was used instead of (a)-1 and (b)-2, 1,000 parts of a dispersion was obtained. Using the dispersion, dyeing was carried out under the same condition as above. The results are shown in Table 6.

EXAMPLES 2–10

Prepared according to the same manner as in Example 1, except that compounds (a)-1 and (b)-2 and their amounts were changed as described in Table 5 or 6, a dispersion was obtained. Using each of the dispersion thus obtained, dyeing was conducted. The results are shown in Table 5 and 6. The results show excellent build-up, tarring, light fastness and washing fastness.

Comparative example 3

Dye dispersion was prepared by using 1.0 part of C.I. Disperse Red 356 and, using the dye dispersion, dyeing was carried out according to the same condition as in Example 1. The results are shown in Table 6.

Comparative example 4

Example 1 was repeated except that 0.7 part of C.I. Disperse Red 356, a benzodifuranone conpound which is not included the group of the compounds represented by the above formula (I) and 0.3 part of the compound (b)-2 in Table 2 was used. The results are shown in Table 6. No effect in build-up, tarring and light fastness due to the combination of the compounds was observed.

EXAMPLE 11

6 Dyeing baths each the same as the Dyeing bath-1 in Example 1 were prepared, and to each of the baths, 100 parts of Tetron "tropical" cloth was dipped. Then dyeing was effected according to the same condition as in Example 1 using 2 test dyeing devices (Color Pet made by NIHON SENSHOKU KIKAI KABUSHIKI KAISHA), each one being used for 3 baths. All of the dyed cloths thus obtained had no blotches. They had same dyeing power and hue. These results show that there was no difference between the test dyeing devices and excellent dyeing reproduceability.

TABLE 5

| Example No. | Compound used | Amount used | Build-up | Tarring | Fastness light | Fastness washing |
|---|---|---|---|---|---|---|
| 1 | (a)-1 (b)-2 | 0.7 part 0.3 | ⊚ | ○ | ⊚ | ○ |
| 2 | (a)-2 (b)-4 | 0.6 0.4 | ○ | ○ | ○ | ⊚ |
| 3 | (a)-1 (b)-7 | 0.8 0.2 | ⊚ | ⊚ | ○ | ⊚ |
| 4 | (a)-1 (b)-10 | 0.7 0.3 | ⊚ | ⊚ | ⊚ | ⊚ |
| 5 | (a)-1 (b)-17 | 0.7 0.3 | ⊚ | ⊚ | ⊚ | ⊚ |
| 6 | (a)-1 (b)-30 | 0.8 0.2 | ⊚ | ⊚ | ⊚ | ⊚ |
| 7 | (a)-1 (b)-32 | 0.7 0.3 | ⊚ | ⊚ | ⊚ | ⊚ |

TABLE 6

| Example No. | Compound used | Amount used | Build-up | Tarring | Fastness light | Fastness washing |
|---|---|---|---|---|---|---|
| 8 | (a)-1 (c)-8 | 0.5 part 0.5 | ⊚ | ⊚ | ⊚ | ⊚ |
| 9 | (a)-1 (c)-3 (c)-4 | 0.5 0.3 0.2 | ⊚ | ○ | ⊚ | ⊚ |
| 10 | (a)-1 (c)-10 | 0.7 0.3 | ⊚ | ○ | ○ | ⊚ |
| Comparative Example 1 | (a)-1 | 1.0 | ○ | Δ | Δ | ⊚ |
| Comparative Example 2 | (a)-2 | 1.0 | X | Δ | Δ | ⊚ |
| Comparative Example 3 | C.I. Disp. Red 356 | 1.0 | X | Δ | Δ | ⊚ |
| Comparative Example 4 | C.I. Disp. Red 356 (b)-2 | 0.7 0.3 | X | Δ | Δ | ⊚ |

What we claim is:

1. A composition containing benzodifuranone compounds for coloring hydrophobic materials in red which comprises at least one compound selected from the group of benzodifuranone compounds represented by the formula (I)

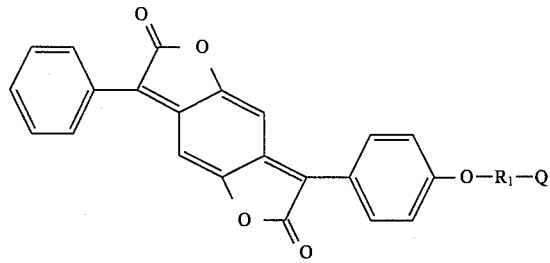

wherein $R_1$ represents a methylene group or a straight chain or branched $C_{2-6}$ alkylene group which may be optionally substituted by a $C_{1-4}$ alkoxy, a hydroxy or $C_{1-4}$ alkylcarbonyloxy group, Q represents a 5- or 6-membered saturated or unsaturated heterocyclic ring residue which may be optionally substituted; and at least one compound selected from the group consisting of benzeneazo compounds represented by the formula (II)

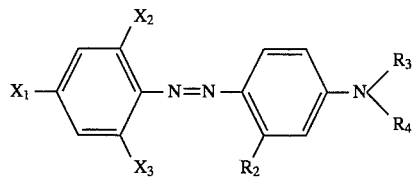

wherein $X_1$ represents a nitro group or $C_{1-4}$ alkyl group, $X_2$ represents a hydrogen atom or a cyano group, $X_3$ represents a hydrogen atom, a halogen atom, a cyano group, a $C_{1-4}$ alkylsulfonyl group or a $C_{1-4}$ alkoxy group, $R_2$ represents a hydrogen atom, a halogen atom, a $C_{1-4}$ alkyl group, a $C_{1-4}$ alkylcarbonylamino group, a phenylcarbonylamino group or a $C_{1-4}$ alkylsulfonylamino group, $R_3$ and $R_4$ each independently represent a $C_{1-4}$ alkyl group, a $C_{1-4}$ alkyl group substituted by $C_{1-4}$ alkylcarbonyloxy, $C_{1-4}$ alkoxycarbonyl, phenylcarbonyloxy, phenyl, $C_{1-4}$ alkoxy, $C_{1-4}$ alkoxy which is substituted by a $C_{1-4}$ alkoxy group, $C_{1-4}$ alkoxycarbonyloxy, phenoxy, hydroxy or cyano or a 2-(pyrrolidine-2,5-dione)ethyl group and benzothiazolazo compounds represented by the formula (III)

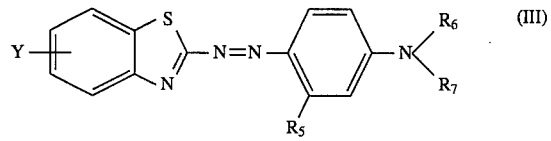

wherein Y represents a hydrogen atom, a halogen atom, alkoxy group, a $C_{1-4}$ alkylsulfonyl group or a nitro group, $R_5$ represents a hydrogen atom, a $C_{1-4}$ alkyl group, a phenylcarbonylamino group, a alkyl carbonylamino group, $R_6$ and $R_7$ each independently represent a $C_{1-5}$ alkyl group, a $C_{1-4}$ alkyl group substisuted by hydroxy, $C_{1-4}$ alkylcarbonyloxy or cyano.

2. The composition of claim 1 wherein the ratio based on pure content of formula (I) to at least one member selected from the group consisting of compounds represented by formula (II) and formula (III) is 80–20 weight % to 20–80 weight %.

3. A method for dyeing hydrophobic materials by applying the composition according to claim 1 to the material.

4. The composition of claim 1 which contains compounds represented by formulae (I), (II) and (III).

5. A method of printing hydrophobic materials by applying the composition according to claim 1 to a material to be printed.

6. The method of claim 3 which includes after finishing treatment of the colored hydrophobic materials.

7. The method of claim 6 wherein the after finishing includes heat treatment.

8. The method of claim 7 wherein the heat treatment is conducted at temperatures of 100° C. or higher at elevated pressure.

* * * * *